United States Patent [19]

Hatch et al.

[11] Patent Number: 4,748,312

[45] Date of Patent: May 31, 1988

[54] PLASMA-ARC TORCH WITH GAS COOLED BLOW-OUT ELECTRODE

[75] Inventors: Bruce O. Hatch, Lebanon; Richard A. Spaulding, Hanover, both of N.H.

[73] Assignee: Thermal Dynamics Corporation, West Lebanon, N.H.

[21] Appl. No.: 850,504

[22] Filed: Apr. 10, 1986

[51] Int. Cl.⁴ .................................................. B23K 9/00

[52] U.S. Cl. ....................... 219/121 PR; 219/121 PQ; 219/75; 219/121 PN; 219/121 PP

[58] Field of Search ................. 219/121 PM, 121 PN, 219/121 PQ, 121 PR, 121 PP, 121 P, 75, 76.16, 74; 313/231.41, 231.51

[56] References Cited

U.S. PATENT DOCUMENTS

| | | | |
|---|---|---|---|
| 3,408,518 | 10/1968 | Strupczewski | 219/121 PR |
| 3,450,926 | 6/1969 | Kiernan | 219/121 PR |
| 4,059,743 | 11/1977 | Esibian et al. | 219/121 PP |
| 4,311,897 | 1/1982 | Yerushalmy | 219/121 PQ |
| 4,558,201 | 12/1985 | Hatch | 219/121 PP |
| 4,581,516 | 4/1986 | Hatch et al. | 219/121 PP |

*Primary Examiner*—M. H. Paschall

*Attorney, Agent, or Firm*—Majestic, Gallagher, Parsons & Siebert

[57] ABSTRACT

A plasma-arc cutting torch housing defines a chamber which has an outlet at the end of the housing. The torch also includes an electrode in the chamber near the outlet and a provision in the chamber for separating the gas flowing towards the outlet of the housing into a primary gas flow adjacent to the electrode for generating a plasma and a secondary gas flow away from the electrode for cooling the torch and the workpiece. The electrode has a centrally disposed bore therethrough for conveying gas. An insert in the workpiece end of the electrode burns away so as to expose the essentially disposed bore therethrough, thereby automatically quenching operation of the plasma arc so as to minimize damage to the torch. In the preferred embodiment, the electrode has a stepped centrally disposed bore which stops short of the insert. In an alternate embodiment, the stepped bore extends through to the insert and accommodating insert bore. A generally cylindrical insulator is also provided for directing the primary and secondary gas flows.

8 Claims, 2 Drawing Sheets

PLASMA-ARC TORCH WITH GAS COOLED BLOW-OUT ELECTRODE

BACKGROUND OF THE INVENTION

This invention is related generally to plasmarc torches which are used for metal cutting. More particularly, this invention is directed to an improved torch and blow-out electrode therefore for shutting down torch operation when the electrode has been used up.

Plasma torches, also known as electric arc or plasma-arc torches, are commonly used for cutting of workpieces and operate by directing a plasma consisting of ionized gas particles toward the workpiece. In the operation of a typical plasma torch, such as illustrated in U.S. Pat. Nos. 4,324,971; 4,170,727; and 3,813,510, assigned to the same assignee as the present invention, a gas to be ionized is supplied to the front end of the torch in front of a charged electrode. The tip, which is adjacent to the end of the electrode at the front end of the torch, has a sufficiently high voltage applied thereto to cause a spark to jump across the gap between the electrode and tip, thereby heating the gas and causing it to ionize. A pilot DC voltage between the electrode and the tip maintains a non-transferred arc known as the pilot arc. The ionized gas in the gap appears as a flame and extends outwardly from the tip. As the torch head or front end is moved towards the workpiece, a transferred or cutting arc jumps from the electrode to the workpiece since the impedance of the workpiece current path is lower than the impedance of the welding tip current path.

In conventional torches, the charged electrode is typically made of copper with a tungsten electrode insert and current flows between the tungsten insert and the torch tip or workpiece when the torch is operated. Tungsten is oxidized easily at high tempertures so that if the gas to be ionized is air, the tungsten insert becomes oxidized and is rapidly consumed, thus necessitating frequent replacement. The gas to be used for creating the plasma is typically an inert gas, such a nitrogen or argon, in order to reduce oxidation and thereby prolong electrode life. Where air is used, materials resistant to oxidation such as hafnium or zirconium have been used as the electrode insert material.

Regardless of the type of insert material, the insert is normally burned away during use. When it is burned away, the old electrode must be removed and replaced by a new electrode. One problem is engendered in that the torch may be damaged if it is allowed to operate after the insert has burned away, which condition is not always readily aparent to the torch operator. It is therefor desirable to have some means for sensing when the electrode has been used up and for automatically shutting down torch operation without operator intervention.

Frequently, a secondary gas flow is also provided in conventional plasma torches for various different purposes. The most common purpose of a secondary gas flow immediately adjacent and surrounding the electric arc is to cool the torch. The secondary gas helps to blow away the metal that is melted by the arc which helps to achieve a straighter kerf and therefore a cleaner cut. In conventional plasma torches, two gas lines are provided: one for supplying the plasma forming gas and the other supplying gas for the secondary gas flow. If different gases are used for the plasma forming gas and the secondary gas, operation of the torch will require two gas supplies, lines, etc. Having to use two gas lines is inconvenient to torch operators and using two gas supplies is expensive. Therefore, it is desirable to provide a plasma torch which requires only one gas line and only one gas supply. My co-pending application Ser. No. 515,913 filed July 20, 1983, now U.S. Pat. No. 4,581,516, also assigned to the same assignee hereof, shows such a plasma-arc torch.

It is thus desirable to have a plasma-arc torch which uses only a single gas both for the plasma forming gas as well as the secondary gas. It is also advantageous that the electrode be cooled so as to decrease consumption of the electrode insert. One such plasma-arc torch having these features is disclosed in U.S. Pat. No. 4,558,201, also assigned to the same assignee hereof.

While the patent device provides one type of gas flow, it is desired to have improved gas flow and therefor improved cooling of the electrode so as to decrease the frequency of replacement thereof.

SUMMARY OF THE INVENTION

The plasma-arc torch of this invention includes an electrode in a chamber near the outlet and means in the chamber for separating the gas flowing towards the outlet of the housing into a primary gas flow adjacent to the electrode for generating a plasma and a secondary gas flow away from the electrode for cooling the torch and the workpiece.

The electrode also includes an axial passage therein. The axial passage provides a "blow-out" feature so as to automatically extinguish and prevent re-starting of the cutting arc when the electrode is totally consumed. This feature is accomplished by an increased gas flow through the arc chamber due to the opening up of communication between a main, axial cooling passage in the electrode and the arc chamber caused by the burning away of the electrode insert and electrode which normally blocks this axial passage.

The plasma-arc torch of this invention further provides a gas separator for separating the gas into the primary and secondary gas flows. The gas separator is of generally cylindrical configuration and serves to at least partially define the arc chamber as well as an outer chamber, the latter chamber feeding secondary gas to a gas distributor. Means are provided whereby the primary gas flow contact substantially the entire electrode surface thereby providing enhanced cooling and reducing the frequency of replacement.

DETAILED DESCRIPTION OF THE PREFERRED EMBODIMENT

Figure 1:
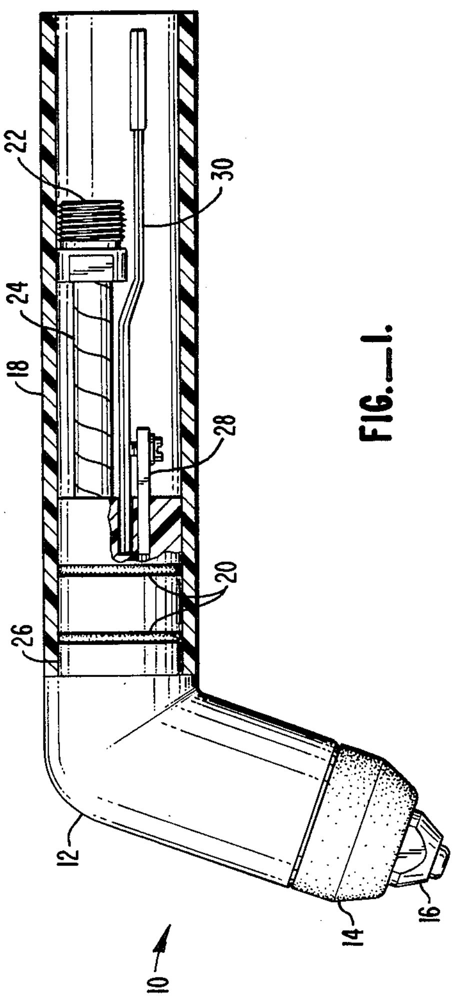
FIG. 1 is an elevational view, partially cut away, of the plasma-arc torch of this invention.

FIG. 1 is a partial cross-sectional view of a plasma-arc torch shown generally at 10, having the rear portion cut away to show details thereof. The torch generally comprises a head 12 having a cup 14 of ceramic material and a tip 16 made of copper material at the front or head end thereof. The generally tubular handle portion 18 is provided for manual gripping of the torch. As seen, the handle is of generally tubular configuration, and is removably fitted to the head 12 by means of a pair of circular O-rings 20.

Working gas is provided to the torch through a gas inlet fitting and power lead 22 and thence through an inlet to 24 which is embedded into body 26 of head 12. Both power and gas are carried through fitting 22. A pilot lead 28 consisting of a metal strip is also embedded into head 12 for purposes of conducting electrical current to the torch. A flat strip of electrically non-conducting material in the form of an insulator lead 30 is also embedded in head 12 between inlet tube 24 and pilot lead 28 for purposes of electrical separation.

Figure 2B:
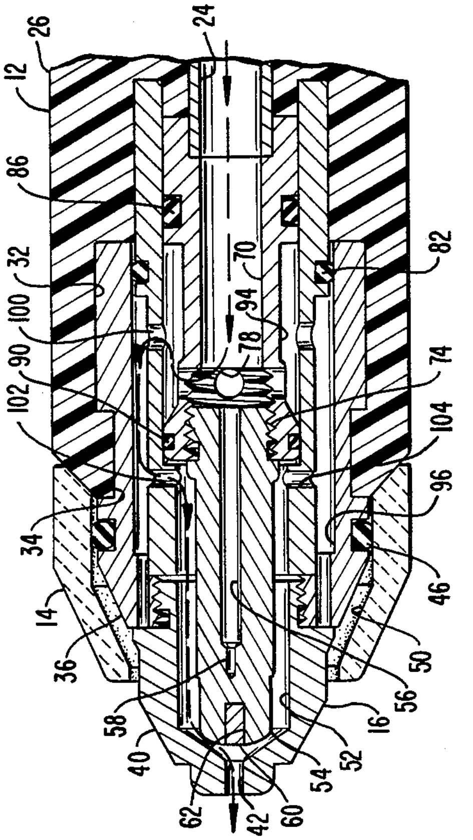
FIG. 2B is a view of the same, rotated 90°, illustrating the primary gas flow path.
Figure 2A:
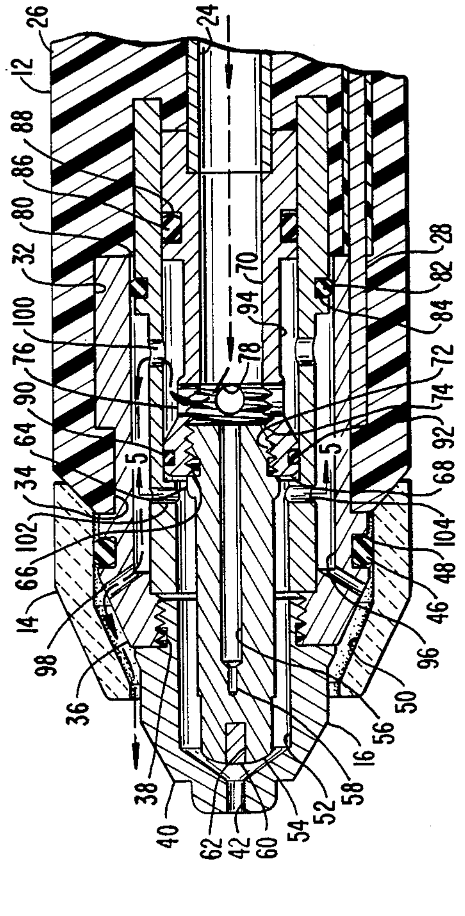
FIG. 2A is a cross sectional view of the front part (torch head) of a plasma-arc torch of this invention, illustrating a secondary gas flow path.
Figure 3:
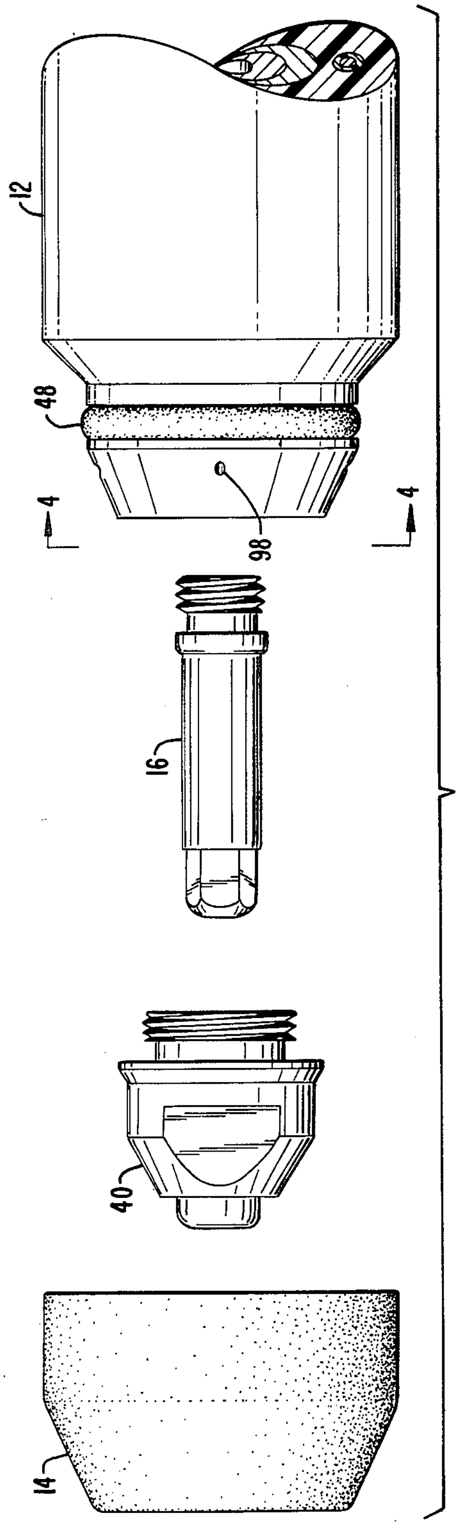
FIG. 3 is an exploded view of the torch head illustrating parts thereof.

Turning to FIG. 2A, a cross-sectional view of the front or head portion of the torch is shown. As shown in this Figure, body 26 is of electrically non-conducting material such as plastic. Body 26 has a recess 32 therein having an open outlet 34. Within the outlet is a generally cylindrical gas diffuser 36 which may be made of copper or other electrically conductive material. Threadedly secured within the outlet 38 of diffuser 36 is a cup-shaped tip 40 of electrically conductive material such as copper. Tip 40 has an opening 42 in the front end thereof for passage of the transferred arc as well as the primary gas flow, as will be more fully described hereinafter.

Removably fitted over the gas diffuser 36 and a portion of the tip 40 is a cup 14 of thermally and electrically insulated material such as ceramic. The cup is supported on diffuser 36 by means of a frictional fit over an anode O-ring 46 contained within an accommodating groove 48 on the outer peripheral surface of diffuser 36. The diffuser, tip, and cup interior are dimensioned so as to provide an annular chamber 50 for directing secondary gas flow around to tip 40 as seen in this figure. Tip 40 defines an arc chamber 52 within which is positioned an electrode 54. The electrode is of generally elongated shape having an axial passage therein extending from a first or inlet end into the electrode. The passage is stepped so that end portion 58 is of a lesser diameter than that of the rest of the passage. The generally cylindrical insert 60 is contained within an accommodating insert bore 62 in the opposite end of the electrode. As may be seen, passage 56, 58, stop short of insert bore 62 and insert 60 therein.

The electrode 54 has an annular flange 64 at the inlet end thereof which abuts against end wall 66 of generally cylindrical support member 68 within recess 32.

Support member 68 is of generally cylindrical configuration, and having an internal, axial passage 70 therethrough, electrode 54 is threadedly supported within the outlet end of passage 70 by means of accommodating threads 72, 74. A pair of intersecting cross passages 76, 78, are contained within the outlet end of support member 68 for a purpose to be hereinafter described.

A generally cylindrical insulator 80 of electrically non-conductive material such as plastic circumscribes both the support member 68 as well as a portion of electrode 54. An insulator O-ring 82 fitted within an accommodating groove 84 on the exterior of insulator 80 ensures a gas-tight fit with diffuser 36. Similarly, a cathode O-ring 86 contained within a groove 88 around the periphery of support member 68 is also provided. In like manner, a further cathode O-ring 90 contained within a groove 92 at the forward or outlet end of the support member helps to create a gas seal against insulator 80.

Support member 68 is shaped so as to create an annular inner chamber 94 with insulator 80. An outer annular chamber 96 is created between insulator 80 and the inner wall of gas diffuser 36. A plurality of gas diffuser passages 98 intercommunicate outer chamber 96 with annular chamber 50. In this manner, gas flowing from the gas inlet through tube 24 passes through passage 70 and cross passages 78, 80. Secondary gas flow then enters inner chamber 94 and thence passes through a plurality of passages 100 in insulator 80, and thence into outer chamber 96. From outer chamber 96 secondary gas flow then passes through diffuser passages 98, and annular chamber 50 to exit around tip 40, thereby providing a cooling effect.

Figure 5:
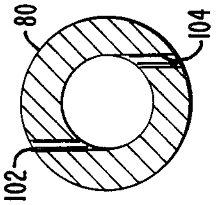
FIG. 5 is a cross-sectional view taken along lines 5—5 in FIG. 2A.
Figure 4:
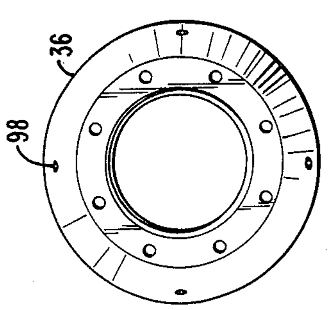
FIG. 4 is a view taken along lines 4—4 in FIG. 3.

Turning to FIG. 2B, the primary gas flow takes the same flow path as the secondary gas flow until it reaches outer chamber 96. At this point, primary gas flow is directed through a plurality of gas flow passages 102, 104 and thence into arc chamber 52 surrounding electrode 54. From here, gas exits through opening 42, thereby cooling the electrode and providing the plasma for the plasma arc. As best seen in FIG. 5, tangential passages 102, 104 are directed so as to provide a swirl or vortex to the primary gas flow.

It should also be appreciated that primary gas flowing through passages 102, 104 contact substantially the entire length of electrode 54. This is due to the fact that the passages are positioned adjacent the fixed end of the electrode so that the primary gas flow is directed along the length of the electrode before it exits opening 42 in tip 40.

DETAILED DESCRIPTION OF THE ALTERNATE EMBODIMENT

Figure 6:
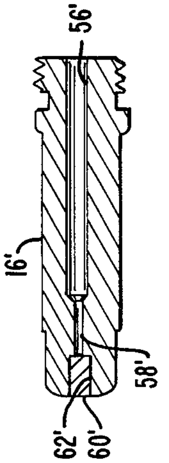
FIG. 6 is a cross-sectional view of an alternate embodiment of the electrode of this invention.

FIG. 6 is a cross-sectional view of an electrode of the instant invention which differs from the primary body electrode in only one respect. This is that passage 58' extends through the electrode body and intersects insert bore 62'. Of course, since insert 60' is fitted within insert bore 62', passage 58' is blocked as well.

In operation with either embodiment, when the torch is operated for a long period of time, the insert 60 will gradually burn away until it is entirely consumed. With the secondary embodiment, axial passage 58 will then be opened and additional gas flow will be combined with the primary gas flow so as to provide a sudden increase in gas flow in arc chamber 52 so as to quench the transferred arc. Alternatively, a decrease in pressure sensed that the inlet end or increase in flow rate can also be monitored and trigger a shutting down of the electrical circuit (not shown) supplying power to power lead 22.

With the primary embodiment, an additional amount of burning of the electrode will occur prior to exposing passage 58. Otherwise, the operation of the device is the same as with the alternate embodiment.

The above description is merely illustrative of the invention and various changes in shapes and sizes, material, or other details are deemed to be within the scope of the appended claims.

We claim:

1. A plasma-arc cutting torch comprising:

a torch housing defining a chamber having an outlet at the end of said chamber;

gas supply means for supplying a gas to said chamber, said gas being suitable for generating plasma and for a secondary gas flow which will cool the torch and a workpiece;

an electrode in the chamber adjacent to the outlet, said electrode being generally elongated and defining a central axis and having first and second opposite ends.

attachment means on said first end of said electrode for removably mounting said electrode within said chamber in said torch housing, an insert bore in said second end extending into said electrode, an insert fitted within and closing off said insert bore, gas separation means in said chamber for separating said gas into a primary gas flow adjacent to said electrode for generating a plasma and a secondary gas flow away from said electrode for cooling the torch and the workpiece, wherein said gas separation means comprises, a generally cylindrical, electrical insulator at least partially surrounding said electrode, said insulator defining an outer chamber with said body and further including passage means for directing gas from said gas supply means to said outer chamber, a cup-shaped torch tip around the end of said electrode and closing off said outlet except for an opening in said tip, said tip and said insulator defining, with said insulator, an inner chamber around said electrode, passage means in said insulator for directing primary gas flow from said gas supply means to said outer chamber, and thence to said inner chamber, and wherein said passage means comprises tangentially directed passages in said insulator so that primary gas from said gas supply means will generate a vortex around said electrode.

2. The invention of claim 1 wherein said passages are positioned so that said primary gas flow is directed along substantially the entire length of said electrode, thereby providing enhanced cooling.

3. The invention of claim 1 further including gas distributor means for directing a secondary gas flow from said outer chamber around said tip.

4. The invention of claim 1 further including an axial passage extending into said electrode from said first end and dimensioned to be of a first, larger diameter from said first end part way into said electrode and of a second, smaller diameter for the remainder of its length so that said passage is stepped.

5. The invention of claim 4 wherein said axial passage extends to a point within said electrode spaced from said insert bore.

6. The invention of claim 4 wherein said attachment means comprise threads peripherally located on said first end.

7. The invention of claim 6 wherein said electrode is made of an electrically conductive material and wherein said insert is made of a metal material.

8. The invention of claim 4 wherein said axial passage extends through said electrode and into said insert bore.

* * * * *